Patented July 10, 1934

1,966,166

UNITED STATES PATENT OFFICE 1,966,166

PRODUCING ALCOHOLS FROM OLEFINES

John A. Davies, South Charleston, W. Va., assignor to Carbide & Carbon Chemicals Corporation, a corporation of New York No Drawing. Application November 12, 1931, Serial No. 574,680

20 Claims. (Cl. 260—156)

Alcohols are produced by the process which includes the steps of absorbing olefine hydrocarbons in sulfuric acid, hydrolyzing the hydrocarbon-acid compounds so formed by heating them with water, and subsequently recovering the alcoholic products of hydrolysis by distillation. The present invention relates to improvements in this process.

It is well known that the higher alkyl sulfates, that is, those obtained by absorbing in sulfuric acid olefine hydrocarbon gases having more than two carbon atoms in the molecule, when hydrolyzed in dilute sulfuric acid tend to yield, not only the desired alcohols, but also polymers and regenerated olefine gases. In laboratory preparations it is therefore common practice to neutralize with alkali the excess acid in the solution to be hydrolyzed. Obviously, however, neutralization with alkali is too uneconomical a procedure to be applied to the commercial process.

I have discovered that this formation of polymers and regenerated olefine in the hydrolysis of the higher dialkyl sulfates is markedly decreased by the addition of a suitable solvent to the reaction mixture. A suitable solvent according to my discovery is one which is miscible in both phases of the mixture, the di-alkyl sulfate phase and the dilute sulfuric acid phase, and may be for example methanol, ethanol, acetone or the like. In general, I prefer to add sufficient of the solvent to make the whole reaction mixture substantially homogeneous, or of a single liquid phase, although I have found that much smaller amounts of solvent are of some benefit.

Experiments which I have made demonstrate the advantages of my invention. For example, 340 grams of butene-1 and butene-2 were absorbed in 992 grams of 80% sulfuric acid. When 2770 grams of water were added to the sulfate liquor thus formed, the resulting mixture separated into two layers, the upper layer containing chiefly di-secondary-butyl sulfate and the lower layer consisting chiefly of mono-secondary-butyl sulfate in solution with the dilute aqueous sulfuric acid. Methanol was added to this mixture, in amount about equal to the weight of the entire mixture, and this formed a single liquid phase which was then boiled to hydrolyze the butyl sulfates and to distill the alcohols from the dilute acid. The alcohols were then separated by fractionation. This method yielded 403 grams of secondary butanol, 8 grams of regenerated butene-2, 12 grams of polymeric oils and 16 grams of methyl secondary butyl ether. This represents a 90% yield of butanol, based on the butene absorbed by the sulfuric acid.

Experiments conducted under conditions similar in every respect to the above, except that no solvent was added to the reaction mixture, gave yields of about 65% of butanol calculated on the same basis, with much higher gas regeneration and oil formation.

It will readily be understood that variations may be made in the above-described procedure. For instance, the order of addition of water and solvent to the sulfate liquor is generally immaterial. My invention therefore should be limited only to my broad discovery of the advantages of a suitable solvent for the hydrolysis mixture, as defined by the appended claims.

I claim:

1. Process of producing alcohols from olefines containing more than two carbon atoms to the molecule which comprises the steps of reacting said olefines with sulfuric acid to form a liquid mixture containing hydrocarbon sulfates; adding water to said mixture, whereby two liquid phases are formed; adding an organic liquid which is miscible with both of said phases; boiling the resultant mixture, whereby the hydrocarbon sulfates are hydrolyzed to alcohols and said alcohols are distilled from the mixture; and separating from said distillate the desired alcohols.

2. Process of producing alcohols from olefines containing more than two carbon atoms to the molecule which comprises the steps of reacting said olefines with sulfuric acid to form a liquid mixture containing hydrocarbon sulfates; adding water to said mixture, whereby two liquid phases are formed; adding an organic liquid which is miscible with both of said phases, in sufficient quantity to make the whole mixture substantialy homogeneous; boiling the resultant mixture, whereby the hydrocarbon sulfates are hydrolyzed to alcohols and said alcohols are distilled from the mixture; and separating from said distillate the desired alcohols.

3. Process of forming alcohols from a mixture containing higher alkyl sulfates and sulfuric acid, which comprises adding water to said mixture to form two liquid phases; adding thereto an organic liquid miscible with both phases; and heating the resultant mixture.

4. Process of forming alcohols from a mixture containing higher alkyl sulfates and sulfuric acid, which comprises adding water to said mixture to form two liquid phases; adding thereto an organic liquid miscible with both phases, in sufficient quantity to make the whole mixture substantially homogeneous; and heating the resultant mixture.

5. The process of hydrolyzing alkyl sulfate mixtures by heating with water, which comprises carrying out the hydrolysis in the presence of an organic liquid miscible with both the water and the alkyl sulfate mixture, said organic liquid being present in sufficient quantity to make the reaction mixture substantially homogeneous.

6. Process of producing alcohols from olefines containing more than two carbon atoms to the molecule which comprises the steps of reacting said olefines with sulfuric acid to form a liquid mixture containing hydrocarbon sulfates; adding water to said mixture, whereby two liquid phases are formed; adding methanol thereto; and boiling the resultant mixture, whereby the hydrocarbon sulfates are hydrolyzed to alcohols and said alcohols are distilled from the mixture; and separating from said distillate the desired alcohols.

7. Process of producing alcohols from olefines containing more than two carbon atoms to the molecule which comprises the steps of reacting said olefines with sulfuric acid to form a liquid mixture containing hydrocarbon sulfates; adding water to said mixture, whereby two liquid phases are formed; adding methanol thereto in sufficient quantity to make the whole mixture substantially homogeneous; boiling the resultant mixture, whereby the hydrocarbon sulfates are hydrolyzed to alcohols and said alcohols are distilled from the mixture; and separating from said distillate the desired alcohols.

8. Process of forming alcohols from a mixture containing higher alkyl sulfates and sulfuric acid, which comprises adding water to said mixture to form two liquid phases; adding methanol thereto; and heating the resultant mixture.

9. Process of forming alcohols from a mixture containing higher alkyl sulfates and sulfuric acid, which comprises adding water to said mixture to form two liquid phases; adding methanol thereto in sufficient quantity to make the whole mixture substantially homogeneous; and heating the resultant mixture.

10. The process of hydrolyzing alkyl sulfate mixtures by heating with water, which comprises carrying out the hydrolysis in the presence of methanol, the quantity of said methanol being sufficient to make the reaction mixture substantially homogeneous.

11. Process of producing alcohols from olefines containing more than two carbon atoms to the molecule which comprises the steps of reacting said olefines with sulfuric acid to form a liquid mixture containing hydrocarbon sulfates; adding water to said mixture, whereby two liquid phases are formed; adding ethanol thereto; and boiling the resultant mixture, whereby the hydrocarbon sulfates are hydrolyzed to alcohols and said alcohols are distilled from the mixture; and separating from said distillate the desired alcohols.

12. Process of producing alcohols from olefines containing more than two carbon atoms to the molecule which comprises the steps of reacting said olefines with sulfuric acid to form a liquid mixture containing hydrocarbon sulfates; adding water to said mixture, whereby two liquid phases are formed; adding ethanol thereto in sufficient quantity to make the whole mixture substantially homogeneous; boiling the resultant mixture, whereby the hydrocarbon sulfates are hydrolyzed to alcohols and said alcohols are distilled from the mixture; and separating from said distillate the desired alcohols.

13. Process of forming alcohols from a mixture containing higher alkyl sulfates and sulfuric acid, which comprises adding water to said mixture to form two liquid phases; adding ethanol thereto; and heating the resultant mixture.

14. Process of forming alcohols from a mixture containing higher alkyl sulfates and sulfuric acid, which comprises adding water to said mixture to form two liquid phases; adding ethanol thereto in sufficient quantity to make the whole mixture substantially homogeneous; and heating the resultant mixture.

15. The process of hydrolyzing alkyl sulfate mixtures by heating with water, which comprises carrying out the hydrolysis in the presence of ethanol, the quantity of said ethanol being sufficient to make the reaction mixture substantially homogeneous.

16. Process of producing alcohols from olefines containing more than two carbon atoms to the molecule which comprises the steps of reacting said olefines with sulfuric acid to form a liquid mixture containing hydrocarbon sulfates; adding water to said mixture, whereby two liquid phases are formed; adding acetone thereto; and boiling the resultant mixture, whereby the hydrocarbon sulfates are hydrolyzed to alcohols and said alcohols are distilled from the mixture; and separating from said distillate the desired alcohols.

17. Process of producing alcohols from olefines containing more than two carbon atoms to the molecule which comprises the steps of reacting said olefines with sulfuric acid to form a liquid mixture containing hydrocarbon sulfates; adding water to said mixture, whereby two liquid phases are formed; adding acetone thereto in sufficient quantity to make the whole mixture substantially homogeneous; boiling the resultant mixture, whereby the hydrocarbon sulfates are hydrolyzed to alcohols and said alcohols are distilled from the mixture; and separating from said distillate the desired alcohols.

18. Process of forming alcohols from a mixture containing higher alkyl sulfates and sulfuric acid, which comprises adding water to said mixture to form two liquid phases; adding acetone thereto; and heating the resultant mixture.

19. Process of forming alcohols from a mixture containing higher alkyl sulfates and sulfuric acid, which comprises adding water to said mixture to form two liquid phases; adding acetone thereto in sufficient quantity to make the whole mixture substantially homogeneous; and heating the resultant mixture.

20. The process of hydrolyzing alkyl sulfate mixtures by heating with water, which comprises carrying out the hydrolysis in the presence of acetone, the quantity of said acetone being sufficient to make the reaction mixture substantially homogeneous.

JOHN A. DAVIES.